(12) United States Patent
Strahle et al.

(10) Patent No.: US 10,561,937 B2
(45) Date of Patent: Feb. 18, 2020

(54) SMART USER INPUT DEVICES, AND SYSTEMS AND METHODS FOR MONITORING SUCH SMART USER INPUT DEVICES

(71) Applicant: PERFORMANCE DESIGNED PRODUCTS LLC, Burbank, CA (US)

(72) Inventors: Brad Strahle, Burbank, CA (US); Antonio Meneses, Burbank, CA (US); Rene Trenado, Burbank, CA (US)

(73) Assignee: PERFORMANCE DESIGNED PRODUCTS LLC, San Diego, CA (US)

( * ) Notice: Subject to any disclaimer, the term of this patent is extended or adjusted under 35 U.S.C. 154(b) by 0 days.

(21) Appl. No.: 15/981,779

(22) Filed: May 16, 2018

(65) Prior Publication Data

US 2018/0333641 A1 Nov. 22, 2018

Related U.S. Application Data

(60) Provisional application No. 62/506,808, filed on May 16, 2017.

(51) Int. Cl.
*A63F 13/24* (2014.01)

(52) U.S. Cl.
CPC .................. *A63F 13/24* (2014.09)

(58) Field of Classification Search
CPC ...................................... A63F 13/24
See application file for complete search history.

(56) References Cited

U.S. PATENT DOCUMENTS

| 2004/0224768 | A1* | 11/2004 | Hussaini | A63F 13/24 463/37 |
| 2011/0050756 | A1* | 3/2011 | Cassidy | G09G 3/20 345/690 |
| 2011/0105231 | A1* | 5/2011 | Ambinder | A63F 13/24 463/38 |
| 2012/0289337 | A1* | 11/2012 | Sternberg | A63F 13/53 463/37 |
| 2013/0190095 | A1 | 7/2013 | Gadher | |

FOREIGN PATENT DOCUMENTS

JP H04149718 5/1992

OTHER PUBLICATIONS

International Search Report and Written Opinion for PCT/US2018033045 dated Jul. 20, 2018, 53 pages.

* cited by examiner

*Primary Examiner* — Jasson H Yoo
(74) *Attorney, Agent, or Firm* — Sheppard, Mullin, Richter & Hampton LLP

(57) ABSTRACT

Implementations of the disclosure describe smart controls for video game controllers that may track and store information related to their use (e.g., actuations) over time to keep track of their expected remaining life. The smart controls may removably couple to a video game controller and be replaced by other smart controls. In implementations, a smart control may include: an actuation component; a sensor to detect actuation of the actuation component in response to movement of the control; a memory to store information associated with the detected actuation; and a casing to house the sensor and memory.

16 Claims, 10 Drawing Sheets

SMART USER INPUT DEVICES, AND SYSTEMS AND METHODS FOR MONITORING SUCH SMART USER INPUT DEVICES

CROSS-REFERENCE TO RELATED APPLICATIONS

This application claims priority to U.S. Provisional Patent Application. No. 62/506,808, filed May 16, 2017, which is incorporated herein by reference in its entirety.

TECHNICAL FIELD

The present disclosure relates generally to videogame controllers, and more particularly some embodiments relate to systems and methods for monitoring and/or analyzing the lifetime of videogame controller components such as user input devices.

BACKGROUND OF THE DISCLOSURE

Modern videogames have become increasingly complex, and so to have the controllers used to play them. Videogame controllers often include a plurality of buttons, paddles, thumb-sticks, joysticks, wheels, pads, triggers and/or dials that may be pressed, pulled, turned or otherwise maneuvered by a user to activate various functions within the videogame being played. As these controls are maneuvered, electrical signals are generated and processed, and ultimately one or more data packets is transmitted (via signal) to the gaming console (e.g., Microsoft Xbox 360®, Sony PS4®, Nintendo Wii®, and/or any other computing device, etc.). The console interprets the signals and effectuates the operations or functionality within the videogame environment that correspond to the controls that were pressed or maneuvered by the user.

Because the controls include mechanical componentry, their structural and mechanical features often wear down or wear out with time, and sometimes fail to perform their intended functionality. Thus, such controls often need to be replaced. In many instances, a control's failure occurs during a game. That is, the failure is discovered as the user attempts to activate certain functionality during a game, and the functionality fails to execute. Such failures can undermine the user's performance in that game, and in future games until they either replace/repair the control, or switch to a different videogame controller with working controls.

SUMMARY

Implementations of the disclosure describe smart controls for video game controllers that may track and store information related to their use (e.g., actuations) over time to keep track of their expected remaining life. The smart controls may removably couple to a video game controller and be replaced by other smart controls. In implementations, a smart control may include: an actuation component; a sensor to detect actuation of the actuation component in response to movement of the control; a memory to store information associated with the detected actuation; and a casing to house the sensor and memory.

In one embodiment, a user input device includes: a structural interface component to coupled to an actuation component; and a sensor module including: the actuation component; a sensor to detect actuation of the actuation component in response to movement of the structural interface component; a memory to store information associated with the detected actuation; and a casing to house the sensor and memory. In implementations, the user input device is a control of video game controller. For example, the structural interface component of the control may include a thumb-stick, a directional pad, a button, a trigger, or a bumper.

In particular implementations, the structural interface component is a thumbstick, the actuation component includes a rod, and the thumbstick is coupled to the rod such that when the thumbstick is moved in a direction, the sensor detects actuation of the rod.

In particular implementations, the structural interface component is a directional pad, the actuation component includes tact buttons, and the directional pad is coupled to the tact buttons such that when the directional pad is pressed in an area over one of the tact buttons, the sensor detects actuation of the tact buttons.

In implementations, the user input device is to electrically and physically couple to the video game controller, and a processor of the video game controller is to receive a signal generated by the sensor in response to detecting actuation. In response to receiving the signal, the processor of the video game controller may cause data to be stored in the memory. For example, the processor may update a stored count of the number of times the control has been actuated, update an estimate of the number of control actuations remaining until expected failure of the control or a component thereof, or update some other parameter stored in the memory that may be used to track the usage and/or life expectancy of the control.

In implementations, the user input device may include one or more conducting pins to electrically couple the user input device to the video game controller such that the video game controller is to cause data corresponding to usage of the user input device to be written into the memory.

In implementations, the user input device may include a light emitting diode to provide a visual indication about a condition of the user input device using at least the information stored in the memory.

In implementations, the memory may store a read-only identifier of the user input device.

In implementations, the memory may store a value corresponding to a total number of detected actuations of the control over a period of time (e.g., a count of actuations since the control was first used, since the control was previously serviced, or during some other period) or a value corresponding to a total number of remaining actuations of the control before expected failure. For example, a count of total detected actuations stored in memory may be incremented each time the control is actuated.

In implementations, the memory may store a value representing a life expectancy of the user input device or a subcomponent of the user input device based on a total number of actuations of the control (e.g., total number of actuations before expected failure). For example, an estimate of total remaining actuations before expected failure may be decremented each the time the control is actuated.

In implementations, the control is removably coupled to the video game controller. For example, usage data stored in the memory of the control may be used to determine that it requires replacement. Thereafter, the control may be uncoupled from the video game controller and replaced by another control. In implementations, the structural interface component to removably coupled to the actuation component.

In one embodiment, a video game controller includes: a control, the control including: an actuation component; a sensor to detect actuation of the actuation component in response to movement of the control; a memory to store information associated with the detected actuation; and a casing to house the sensor and memory. In implementations, the control electrically and physically couples to the video game controller, and the video game controller includes a processor configured to receive a signal generated by the sensor in response to detecting actuation, and the processor causes data to be stored in the memory in response to receiving the signal.

In some implementations, the video game controller may include a plurality of controls, each of the controls respectively including: an actuation component; a sensor to detect actuation in response to movement of the control; a memory to store information associated with the detected actuation; and a casing to house the control's sensor and memory. Each of the plurality of controls may electrically and physically couple to the video game controller. The memory of each of the plurality of controls may store a value corresponding to a total number of detected actuations of the control over a period of time or a value corresponding to a total number of remaining actuations of the control before expected failure. Each of the plurality of controls may be removably coupled to the video game controller.

In one embodiment, a method includes: detecting movement of a control of a video game controller; storing a record of the occurrence of the movement in a memory of the control; computing a total usage measure for the control using at least the stored record and prior detected movements of the control; and determining an expected life of the control using at least the total usage measure. In implementations, the method further includes: presenting a graphical user interface to a user, the graphical user interface displaying a visual representation of the determined expected life. In implementations, the method may implemented by using a processor to execute instructions stored in a non-transitory computer-readable medium. For example, the method may be implemented by executing instructions stored in a storage of a controller, a storage of a control, and/or a storage of a gaming console.

Other features and aspects of the disclosed technology will become apparent from the following detailed description, taken in conjunction with the accompanying drawings, which illustrate, by way of example, the features in accordance with implementations of the disclosed technology. The summary is not intended to limit the scope of any inventions described herein, which are defined by the claims and equivalents.

It should be appreciated that all combinations of the foregoing concepts (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

BRIEF DESCRIPTION OF THE DRAWINGS

The present disclosure, in accordance with one or more implementations, is described in detail with reference to the following figures. The figures are provided for purposes of illustration only and merely depict example implementations. Furthermore, it should be noted that for clarity and ease of illustration, the elements in the figures have not necessarily been drawn to scale.

Some of the figures included herein illustrate various implementations of the disclosed technology from different viewing angles. Although the accompanying descriptive text may refer to such views as "top," "bottom" or "side" views, such references are merely descriptive and do not imply or require that the disclosed technology be implemented or used in a particular spatial orientation unless explicitly stated otherwise.

The figures are not exhaustive and do not limit the present disclosure to the precise form disclosed.

DETAILED DESCRIPTION

As noted above, modern videogame controllers include a plurality of user input devices ("UIDs") that a user can maneuver to effectuate functionality within a game. Examples of such UIDs include buttons, triggers, paddles, wheels, dials, thumb-sticks, joysticks, directional pads, discs, etc., and related circuitry and componentry. Over time, these UIDs may begin to malfunction. For instance, with increased usage, the structural features of UIDs may begin to wear, become damaged, erode, attract dirt or other particulates that impede movement or other functions, etc. As noted above, such failures may undermine a gamer's performance in the game and future games until the UID is replaced or repaired, or until the controller is replaced.

In view of these drawbacks, there is a need in the art for a way to predict, estimate, or approximate when a control or other mechanical part of a videogame controller will fail, and/or a way to of inform a user of this information before the UID actually fails (so that the user may acquire replacement parts to swap in for their soon-to-fail parts before they actually fail). To this end, the technology of the present disclosure addresses the foregoing drawbacks, and provides solutions to avoid such drawbacks. In accordance with some implementations, the present disclosure is directed toward "smart" UIDs (sometimes referred to as UIDs) that may track and store information related to their use (e.g., actuations) over time to keep track of their expected remaining life.

In accordance with implementations, a smart UID may include a structural interface component ("SIC") coupled to a sensor module component ("SMC") that can be operatively (i.e., mechanically, electrically, and/or communicatively) coupled with a videogame controller or other device and its constituent parts (e.g., its housing, processing engine, memory, power source, etc.). The SMC may include an actuation component, a sensor to detect actuation of the actuation component in response to movement of the structural interface component; and a memory to store information associated with the detected actuation. For example, the memory may store a total number of actuations of the smart UID over its lifetime, a number of actuations remaining before expected failure of the smart UID, and other information that tracks the use and/or condition of the smart UID over its life.

In some implementations, a SIC of a smart UID may be removable and/or replaceable. For example, SICs may be removably coupled to a SMC. In some instances, an entire smart UID may be removable and/or replaceable (including the SIC and SMC associated therewith). Accordingly, a user may keep track of a condition of each smart UID, remove all or part of a UID that has malfunctioned, and repair or replace one or more of its components as needed.

Figure 1:
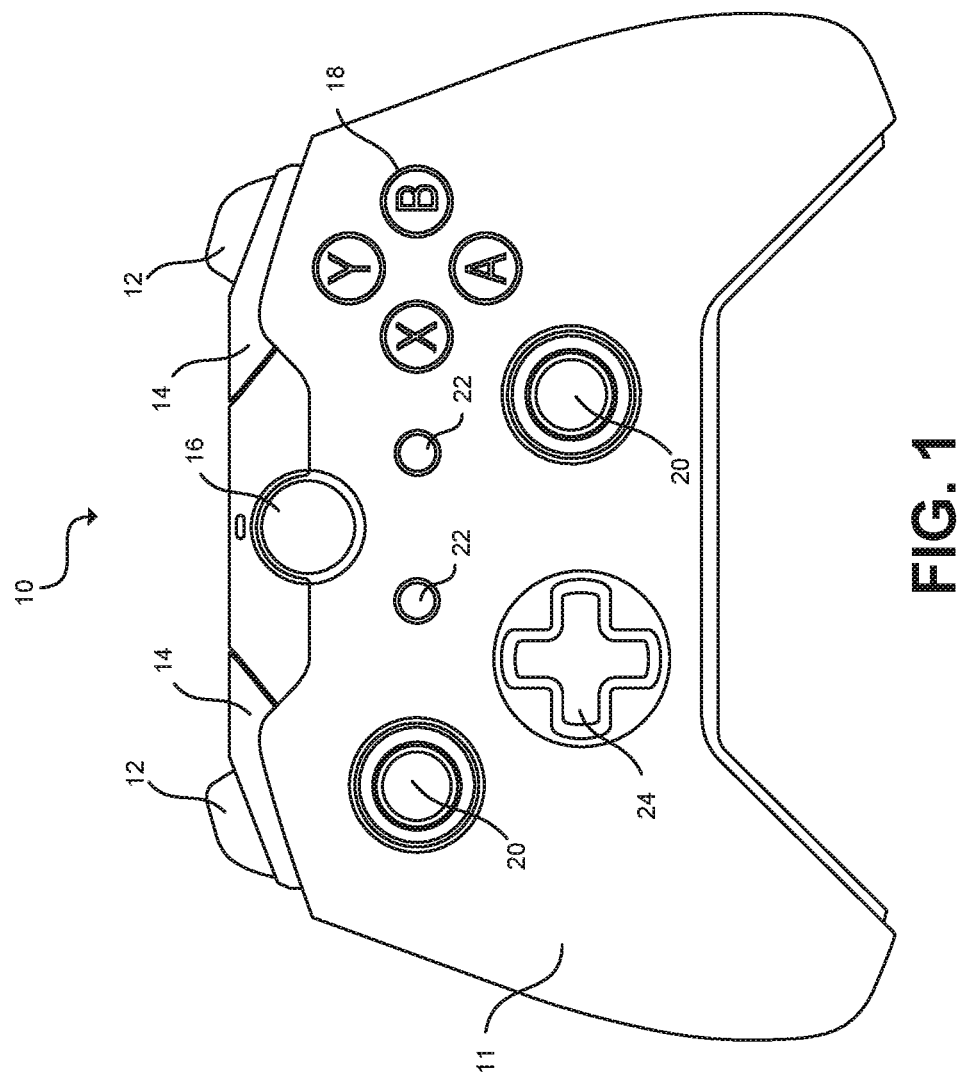
FIG. 1 illustrates a top view of an example videogame controller with multiple UIDs with which the technology described herein may be implemented.

FIG. 1 illustrates a top view of an example videogame controller with multiple UIDs with which the technology described herein may be implemented. As shown, videogame controller 10 includes triggers 12, bumpers 14, guide button 16, A/B/X/Y buttons 18, joysticks 20, back/start buttons 22, and a directional pad 24. For clarity and understanding, reference will be made throughout this disclosure to one or more of the UID types referred to in FIG. 1. It should be appreciated, however, that the technology disclosed herein extends to any style of UID and/or any configuration or arrangement of multiple UIDs as may be desired. Furthermore, the present disclosure may also be applied to other electronics other than videogame controllers that have UIDs subject to failure with increased wear and tear as usage continues (e.g., remote control devices, keyboards and other computer peripherals, telephony devices, calculators, audio/video equipment, voice recording devices, etc.). Application of the present technology to such devices, and to UIDs thereof, will be apparent to a person of ordinary skill in the art upon review of the present disclosure.

Figure 2:
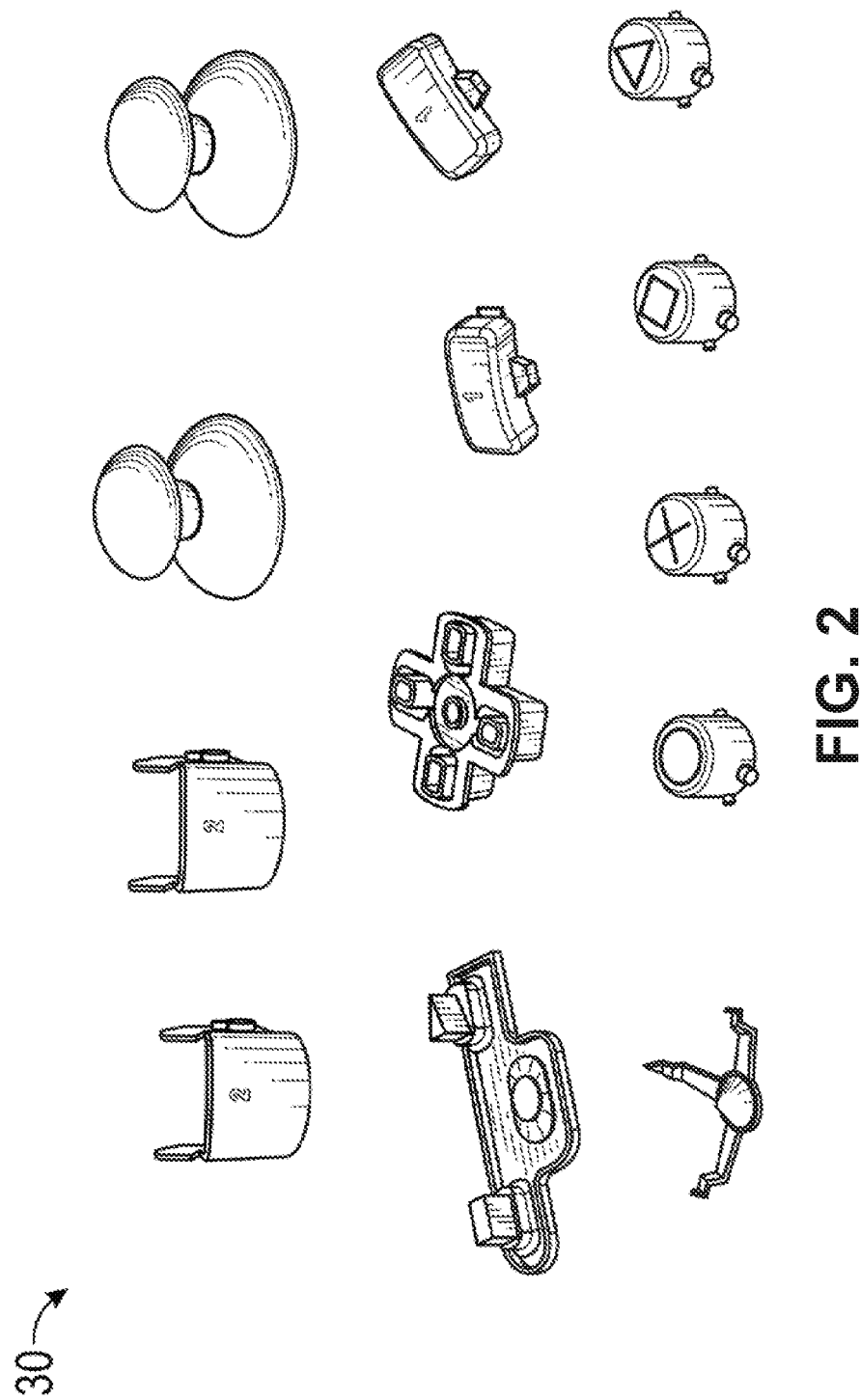
FIG. 2 illustrates several example SICs that may used in UIDs of videogame controllers, in accordance with one or more embodiments of the present disclosure.

FIG. 2 illustrates several example structural interface components (SICs) that may used in UIDs of videogame controllers, in accordance with embodiments.

Figure 3:
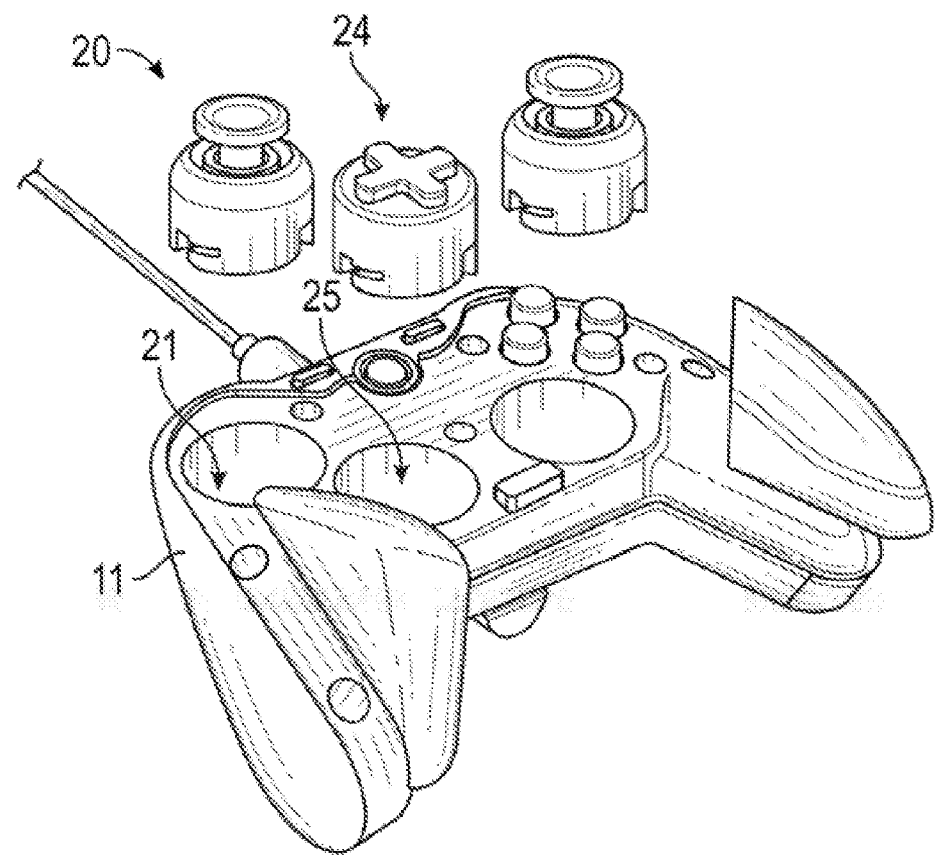
FIG. 3 illustrates a perspective view of an example videogame controller where the directional pad UID and joystick UIDs are shown as removed from their coupled positions with respect to the rest of the videogame controller, in accordance with one or more embodiments of the present disclosure.

FIG. 3 illustrates a perspective view of a videogame controller where the directional pad UID 24 and joystick UIDs 20 are shown as removed from their coupled positions with respect to the rest of the videogame controller. As may be observed, the directional pad UID 24 and joystick UIDs 20 may be mechanically coupled with the videogame controller by being inserted within aperture 25 and aperture 21, respectively, and/or interlocked with one or more locking features accessible from within the apertures (e.g., a snap fit, a twist-lock mechanism, etc.). Further, the UIDs may be electrically and/or communicatively coupled with circuitry of the videogame controller via electrical or electronic features accessible from within aperture 25 and/or aperture 21 (e.g., conductive contact(s), pin receptacle(s), receiver(s), etc.).

Figure 4:
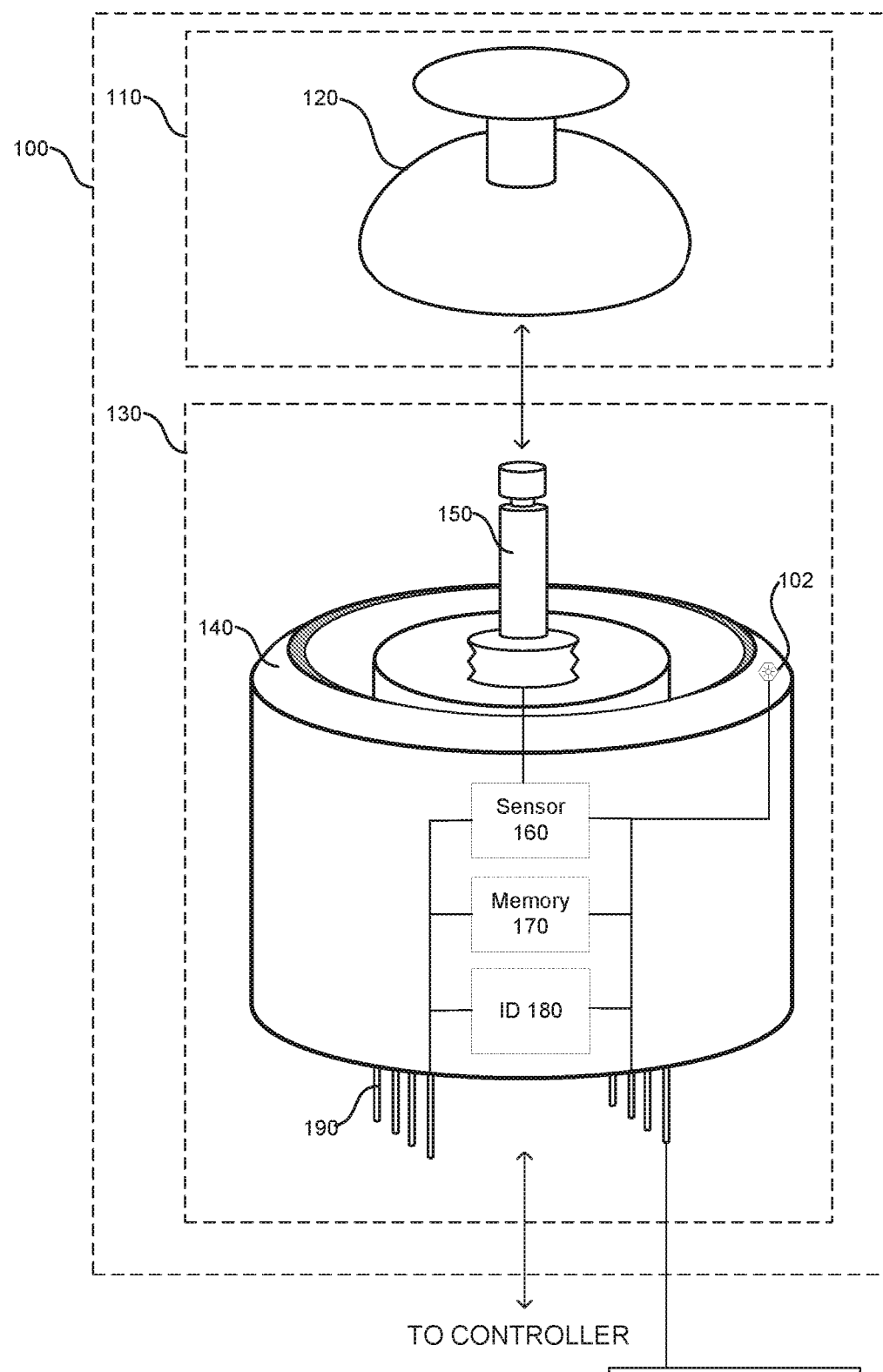
FIG. 4 illustrates a partially exploded view of an example smart UID, in accordance with one or more embodiments of the present disclosure.

FIG. 4 illustrates a partially exploded view of an example smart UID 100 in accordance with one or more embodiments of the present technology. As shown, a smart user input device (UID) 100 may include a structural interface component (SIC) 110 such as joystick 120, and/or a sensor module component (SMC) 130 including a casing 140, actuation componentry (e.g., rod 150 operably coupled with a bearing (not shown) allowing movement), a sensor 160 for detecting operation of the smart UID (such as, for example, movements of the actuation componentry as the SIC 110 is maneuvered by a user), and/or a local memory 170 configured to store information (e.g., statistics) about the smart UIDs movements or other usage characteristics.

As may be observed from FIG. 4, in some embodiments thumbstick 120 may be detachably mated with rod 150 (e.g., in a snap-fit manner), and rod 150 may be coupled with one or more bearing components allowing movement in one or more directions (e.g., pivoting movements, rotational movements, etc.) responsive to the way the user maneuvers thumbstick 120. Sensor 160 may be operatively coupled to either or both of the thumbstick 120 and/or the actuation componentry, and be configured to detect movements thereof. Local memory 170 may be physically coupled with one or more components of the smart UID 100, and be configured to receive, track, and/or store information (e.g., statistics) about the smart UID 100's movements (or movements of a subpart of the smart UID 100) or other usage characteristics about the smart UID 100 (collectively referred to herein as "usage information," or "usage data" or "usage metrics")

Usage information, as well as other information associated with a smart UID may be stored on the local memory 170. For example, in some embodiments the memory 170 may store statistical information, empirical information about the smart UID of the type to which the memory is associated, and/or identification information (discussed below), or any other information, as discussed herein. For instance, the manufacturer of a smart UID 100 may store a value in memory 170 representing the life expectancy of the smart UID or a subpart thereof (e.g., average UID operations-to-failure=25,000 individual toggles of to the left/right/up/down; expected SIC fatigue life=30,000 stress cycles (e.g., 30,000 presses); average revolutions of a wheel type UID before failure=100,000 revolutions; etc.).

In some embodiments, the local memory 170 may store machine readable instructions that, when executed by a processor coupled thereto, compute, estimate, and/or store additional information about the smart UID 100 or a subpart thereof (e.g., total number of presses or toggles to date, number of presses or toggles since a repair event, average number of times pressed or toggled during a gaming session, average number of times pressed or toggled during a certain time period (per day, per week, per year, etc.), proportional use relative to other UIDs of the same controller, or any other pattern of use, etc.).

As shown in FIG. 4, in some embodiments smart UID 100 may include or be configured with an visible indicator, such as LED 102, that may be used to provide a user with a visual indication about the condition of a smart UID 100 or subpart thereof. The visual indication may be operated or activated based on the information stored in the local memory 170 (or information processed in accordance with machine readable instructions stored thereon). Although only one LED is depicted in FIG. 4, multiple LEDs may be provided for the same smart UID 100 (or subpart thereof). The visual indication may be conveyed by one or more LEDs emitting light in accordance with one or more of color, a blinking pattern, a number or pattern of total LEDs emitting light at a given time, etc.

For instance, the LED may be configured to emit a green light when the smart UID 100 or subpart thereof is in good/acceptable condition, a yellow light when the smart UID 100 or subpart thereof is nearing the end of its expected lifetime, and a red light when the smart UID 100 or subpart thereof is either presently malfunctioning or has been used past its expected lifetime (in each case based on one or more metrics, thresholds, and/or relationships between usage and lifetime that are stored in local memory 170). In some embodiments, the light emitted from the LED 102 may follow a gradient from one color to the next, so that the user can qualify the condition of the smart UID 100 or subpart thereof with more precision. For example, the LED 102 may emit a bright green light when the smart UID 100 or subpart thereof is brand new and may gradually fade from bright green to a bright yellow as the smart UID 100 or subpart thereof gradually proceeds toward and reaches its expected half-life, and then gradually fade from bright yellow to bright red as the smart UID 100 or subpart thereof proceeds toward and reaches the end of its expected lifetime, for instance.

In another example, the LED may be configured to emit flashes of light in different patterns associated with different conditions. For example, the LED 102 may emit light constantly when the smart UID 100 or subpart thereof is in good condition (or not beyond a predefined threshold relative to an expected lifetime of the smart UID or subpart thereof), and may begin blinking when the smart UID 100 or subpart thereof is in need of replacement (or beyond a predefined threshold relative to the expected lifetime of the smart UID or subpart thereof).

In still another example, the smart UID 100 or subpart thereof may include multiple LEDs, and the pattern of LEDs emitting light may correspond to the condition of the smart UID 100 or subpart thereof. For instance, a smart UID 100 or subpart thereof may include ten LEDs, with each LED representing 10% of the smart UIDs total remaining life. A brand new (unused) smart UID with this configuration may emit light from all ten LEDs—indicating that 100% of the UIDs life is left remaining. As the smart UID 100 is used, and usage metrics are stored in local memory 170, the LED's may sequentially turn off to indicate the percentage of remaining life left in the smart UID 100 to the user. For instance, if the manufacturer stored in the local memory of a thumbstick styled smart UID a value of 20,000 operations as the expected lifetime metric of the smart UID 100, and the technology disclosed herein tracked and stored the usage of the smart UID 100, one LED may turn off with every 2,000 operations (10% of 20,000) detected for the particular smart UID). Thus, the user can see clearly the amount of life remaining for its UID. As noted, the technology disclosed herein may be applied to a smart UID device as a whole, and/or to individual subparts of the smart UID (e.g., the SIC 110, the SMC 140, etc.).

It should be appreciated that many other visual indicator configurations, patterns, or indications may be utilized to provide a user with information about the remaining life of a smart UID 100 or subpart thereof. Indeed, in some instances the visual indicator may instead (or in addition) be provided on another part that is distinct from and not mechanically coupled to the smart UID 100 or subpart thereof (a charging port, the videogame console, a display or LED on a computer, a smartphone, a tablet, etc.), and may provide more or less information, or different information, than provided in the foregoing examples, based on information stored in the memory 170 including usage information. All such embodiments are contemplated by and intended to fall within the scope of the present disclosure.

In some embodiments smart UID 100 may include or be configured with an audible indicator. That is, in some embodiments, the smart UID 100 may be equipped with or operatively coupled to a speaker, and usage information may be provided to a user via the speaker. For example, a smart UID may include an embedded speaker, and a memory coupled with the smart UID may be configured with machine readable instructions that, when executed by a processor, cause the speaker to audibly announce a usage information about the smart UID (e.g., status, remaining life expectancy in hours/days/percentage, etc.).

As shown, in some embodiments the smart UID 100 may include an identification component 180. In some instance, the identification component 180 may be stored in or otherwise accessible to the local memory 170. For example, the memory 170 may include an identification component 180 for the smart UID 100 in the form of a read-only electronic identification number or other device identifier (e.g., an electronic serial number or ID token). In another example, the smart UID 100 may include a chip (e.g., a microchip), distinct from the memory 170, that may store, provide or otherwise serve as the identification component 180.

Equipped with its own identification component 180 and memory 170, the smart UID 100 is capable of providing information about the way or amount with which it has been used to date. This information may form the basis for an estimated time-to-failure for a given smart UID (or subpart thereof), and may be used to inform a user of the need for a replacement smart UID before the smart UID fails or otherwise malfunctions. Moreover, this information may be useful for a buyer looking to purchase a used replacement smart UID for their controller. The buyer may access the local memory 170 of the smart UID 100 (e.g., by connecting it) to check the statistical and prior usage history information of the smart UID 100 to determine or confirm the seller's claims about the condition and/or history of the smart UID 100's use. Thus, in some embodiments the usage information about a particular smart UID (or subpart thereof) is configured to remain with the smart UID itself, regardless of whether the smart UID is removed from the videogame controller, moved to another controller, or whether it trades hands among users. Accordingly, users can more effectively and accurately track the usage of their UIDs (or subparts thereof) and take steps to replace the smart UIDs (or subparts thereof) in advance of operation failures.

Although the embodiments depicted in FIG. 4 depicts the sensor 160, memory 170, ID component 180, and LED 102 as being housed/embedded within (or otherwise coupled to/with) the casing 140 of SIC 130, one or ordinary skill in the art will appreciate that such components can be housed/embedded within or otherwise coupled to/with any other component of smart UID 100. That is, the present disclosure should be understood to contemplate embodiments where one or more of the sensor 160, memory 170, ID component 180, and LED 102 are housed/embedded within or otherwise coupled to/with any one or more parts of the SIC 110 (e.g., thumbstick 120), the SMC 130 (e.g., rod 150, bearing mechanism (not shown), casing 140, etc.).

Moreover, the present disclosure also contemplates embodiments where there are several sensor(s) 160, local memory 170, ID component 180 and/or LED 102 components, some dedicated to one part of the smart UID 100, and others dedicated to other parts of the smart UID 100. For example, referring to FIG. 4, the SIC 110 may include its own ID component, memory, and/or sensor, and the SMC 130 may include its own ID component, memory, and/or sensor (separate from the SIC 110's). The time-to-failure estimates provided by the technology disclosed herein may, for example, indicate that the SMC 130 is ripe for replacement, but that the SIC 110 has much more life left. Thus, instead of purchasing an entire smart UID 100 apparatus for replacement (including both an SIC and an SMC), the user may instead opt only to purchase a replacement SMC if they wish (and simply snap their current SIC onto the new SMC when it arrives). In this manner, the present technology may help inform a user as to what parts actually need to be replaced and which do not, saving costs and preserving resources.

As shown, smart UID 100 or a subpart thereof may include one or more conducting pins 190. Conducting pins 190 may be operatively coupled to one or more of sensor 160, local memory 170, and/or identification component 180, and may provide a coupling link between one or more of these components (or other components or circuitry of smart UID 100) and one or more components or circuitry of a videogame controller with which the smart UID 100 is used/connected. Conducting pins 190 may enable/allow a processor of a videogame controller to access and/or operate on information stored in memory 170. In some embodiments (e.g., embodiments where the smart UID 100 or subpart thereof does not include its own microprocessor or microcontroller), signals generated by sensor 160 may be interpreted by the videogame controller's processor, and the videogame controller's processor may thereafter cause data to be written into memory 170 that corresponds to usage of the smart UID 100 (e.g., based on the information received from the sensor, and/or in accordance with instructions stored on memory 170). In some embodiments, only certain information may be accessible to a videogame controllers componentry (e.g., its processor), and/or only certain read/write operations may be performed by a videogame controller's componentry. That is, in some embodiments the memory 170 may not be entirely accessible to a non-local processor, and in other embodiments it may.

Although FIG. 4 depicts a thumbstick styled smart UID 100, it should be appreciated that the present technology extends to and may be applied in any and all types or styles of UID componentry (e.g., directional pads, wheels, triggers, sliders, buttons, toggles, switches, wheels, etc.), including any type of UIDs used in other electronic devices as already noted (e.g., telephony devices, remotes, calculators, etc.)

Figure 5:
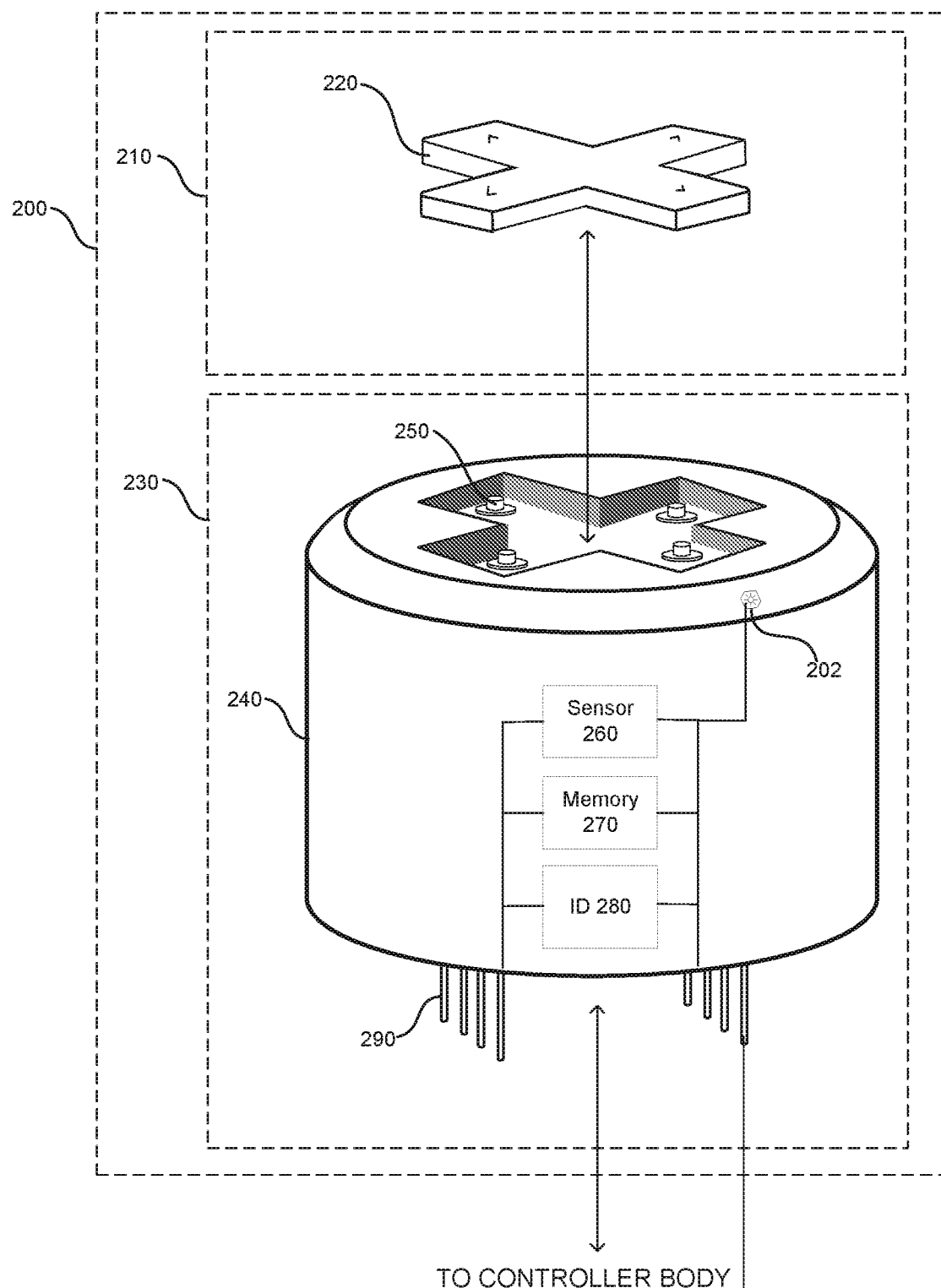
FIG. 5 illustrates a partially exploded view of an example directional pad styled smart UID, in accordance with one or more embodiments of the present disclosure.

For instance, FIG. 5 illustrates a partially exploded view of an example directional pad styled smart UID 200, in accordance with one or more embodiments of the present disclosure. As shown, smart UID 200 may include an SIC 210 such as directional pad 220, and/or an SMC 230 including a casing 240, actuation componentry (e.g., tact buttons 250, exposed through an aperture in casing 240 and operably coupled with an internal control panel such as a printed circuit board), a sensor 260 (e.g., which may be the printed circuit board itself, or another sensory device) for detecting operation of the smart UID 200 (e.g., detecting when the actuation componentry (here, tact buttons 250) is/are engaged), and/or a memory 270 configured to store usage information (e.g., statistics regarding presses of the tact button 250) about the smart UID 200s operation, and/or other information associated with UID.

As may be observed from FIG. 5, in some embodiments directional pad 220 may be removably/detachably fitted within aperture 241 of casing 240 and rest upon or be mated with tact buttons 250. Directional pads may be configured to couple with SMCs or videogame controller structures in a variety of ways, and one with ordinary skill in the art will recognize the present technology may be applied to any such configurations. Some such configurations (not shown in detail) may involve a lower edge of the directional pad 220 being configured with a lip that extends along its perimeter and fits into a complementary channel within the SMC casing 240 (or other structure). In other instances the actuation componentry itself, or another structure nearby, may include structural features that allow complementary features of the directional pad structure to be fitted therewith or snapped thereto. Regardless of the configuration, the directional pad 220 is arranged such that, when pressed by a user in an area over one of the tact buttons, the corresponding tact button will make physical or electrical contact (directly or indirectly) with a sensor 260 (which in some instances may be a printed circuit board with a conducting contact that the tact button touches when pressed) that operates to actuate a signal responsive to the way the user maneuvers directional pad 220. Sensor 260 may be operatively coupled to either or both of the directional pad 220 itself, the casing 240, and/or the actuation componentry (e.g., coupled with a portion of tact buttons 250), and be configured to detect movements/operations thereof or changes thereto. Local memory 270 may be physically coupled with one or more components of the smart UID 200, and be configured to receive, track, and/or store information (e.g., statistics) about the smart UID 200's movements (or movements of a subpart of the smart UID 200) or other usage characteristics about the smart UID 200 (collectively referred to herein as "usage information," "usage data," or "usage metrics").

Usage information, as well as other information associated with a smart UID may be stored on the local memory 270. For example, in some embodiments the local memory 270 may store statistical information, empirical information about smart UIDs of the type to which the local memory is associated or operatively coupled, and/or identification information (discussed below), or any other information, as discussed herein. For instance, the manufacturer of a smart UID 200 may store a value in memory 270 representing the life expectancy of the smart UID 200 or a subpart thereof (e.g., average UID operations-to-failure=60,000 collective presses, whether to the left/right/up/down, expected SIC fatigue life=23,000 stress cycles (e.g., 23,000 presses of an individual portion of the directional pad (i.e., 23,000 presses of the left direction portion of the directional pad 220), average tact button time to failure=6 years from first use under low use conditions, 4 years from first use under moderate use conditions, 2 years from first use under high/excessive use conditions, etc.).

In some embodiments, the local memory 270 may store machine readable instructions that, when executed by a processor coupled thereto, compute and/or estimate additional information about the smart UID 200 or a subpart thereof, e.g., total number of presses to date, number of presses since a repair event, average number of times pressed during a particular game or gaming session, average number of times pressed during a certain time period (e.g., per day, per week, per year, etc.), proportional use relative to other smart UIDs of the same controller (based on any one or more of the foregoing metrics, or other metrics), or any other pattern of use, etc.

As shown in FIG. 5, in some embodiments smart UID 200 may include or be configured with an visible indicator, such as LED 202, that may be used to provide a user with a visual indication about the condition of a smart UID 200 or subpart thereof. The visual indication may be operated or activated based on the information stored in the memory 270 (or information processed in accordance with machine readable instructions stored thereon). Although only one LED is depicted in FIG. 5, multiple LEDs may be provided for the same smart UID 200 or subpart thereof. As explained above with reference to FIG. 4, the visual indication may be conveyed in any manner, including by one or more LEDs emitting light in accordance with one or more of color, a blinking pattern, a number of total LEDs emitting light at a given time, etc., or any combination of the foregoing. It should be appreciated that many other visual indicator configurations, patterns, or indications may be utilized to provide a user with information about the remaining life of a smart UID or subpart thereof. Indeed, in some instances the visual indication (e.g., the LED) may instead (or in addition) be provided on another part that is distinct from and not mechanically coupled to the smart UID (a charging port, the videogame console, a display or LED on a computer, a smartphone, a tablet, etc.), and may provide any amount of detail that may be obtained from the information stored on or determined from information stored on local memory 270. All such embodiments are contemplated by and intended to fall within the scope of the present disclosure.

In some embodiments smart UID 200 may include or be configured with an audible indicator. That is, in some embodiments, smart UID 200 may be equipped with or operatively coupled to a speaker, and usage information may be provided to a user via the speaker. For example, a smart UID may include an embedded speaker, and a memory coupled with the smart UID may be configured with machine readable instructions that, when executed by a processor, cause the speaker to audibly announce a usage information about the smart UID (e.g., status, remaining life expectancy in hours/days/percentage, etc.).

As shown, in some embodiments the smart UID 200 may include an identification component 280. In some instance, the identification component 280 may be stored in or otherwise accessible to local memory 270. For example, the memory 270 may include an identification component 280 for the smart UID 200 in the form of a read-only electronic identification number or other device identifier (e.g., an electronic serial number or ID token). In another example, the smart UID 200 may include a chip (e.g., a microchip), distinct from the memory 270, that may store, provide or otherwise serve as the identification component 280 (a part identifier).

Equipped with its own identification component 280 and memory 270, the smart UID 200 (or subpart thereof) is capable of providing information about the way or amount with which it has been used to date. In other words, with the technology disclosed herein, the history of the smart UIDs usage may be tracked, monitored, maintained, and/or used to assess the condition of the smart UID. Such information may include or form the basis for an estimated time-to-failure for a given smart UID (or subpart thereof), and may be used to inform a user of the need for a replacement UID before the smart UID 200 fails or otherwise malfunctions. In another example, this information may be useful for a buyer looking to purchase a replacement smart UID for their controller. The buyer may access the local memory 270 of the smart UID 200 being sold to check the statistical and prior usage history information of the smart UID 200 to confirm the seller's claims about the condition and/or history of the smart UID 200's use. As discussed in more detail below, a smart UID may be coupled with a computing device configured to receive or read information from the smart UID's memory and generate a report based on the information stored therein. The present disclosure provides a solution to meet the need in the market for tracking usage information about buttons, paddles, triggers, wheels, dials, thumb sticks, directional pads, etc. of videogame controllers. In particular, in some embodiments the present disclosure provides a way for the usage information about a particular smart UID (or subpart thereof) to physically remain with the smart UID itself, regardless of whether the smart UID is removed from the videogame controller, moved to another controller, or whether it trades hands among users. Accordingly, users can more effectively and accurately track the usage of UIDs (or subparts thereof) and take steps to replace the UIDs (or subparts thereof) in advance of operation failures.

Although the embodiments depicted in FIG. 5 depicts the sensor 260, local memory 270, ID component 280, and LED 202 as being housed/embedded within (or otherwise coupled to/with) the casing 240 of SIC 230, one or ordinary skill in the art will appreciate that such components can be housed/embedded within or otherwise coupled to/with any other component of smart UID 200. That is, the present disclosure should be understood to contemplate embodiments where one or more of the sensor 260, local memory 270, ID component 280, and LED 202 are housed/embedded within or otherwise coupled to/with any one or more parts of the SIC 210 (e.g., directional pad 120), one or more parts of the SMC 230 (e.g., tact button 250, printed circuit board (not shown), casing 240, etc.).

Moreover, the present disclosure also contemplates embodiments where there are several sensor(s) 260, memory 270, ID component 280 and/or LED 202 components, some dedicated to one part of the smart UID 200, and others dedicated to other parts of the smart UID 200. For example, referring to FIG. 5, the SIC 210 may include its own ID component, memory, and/or sensor, and the SMC 230 may include its own ID component, memory, and/or sensor (separate from the SIC 210's). The time-to-failure estimates provided by the technology disclosed herein may, for example, indicate that the SMC 230 is ready for replacement, but that the SIC 210 has much more life left. Thus, instead of purchasing an entire UID replacement (including both an SIC and an SMC), the user may instead opt to purchase only a replacement SMC if they wish (and simply snap their current SIC onto the new SMC when it arrives). In this manner, the present technology may help inform a user as to what parts actually need to be replaced, and which do not, saving costs and preserving resources.

As shown, smart UID 200 or a subpart thereof may include one or more conducting pins 290. Conducting pins 190 may be operatively coupled to one or more of sensor 260, local memory 270, and/or identification component 280, and may provide a coupling link between one or more of these components (or other components or circuitry of smart UID 200) and one or more components or circuitry of a videogame controller with which the smart UID 200 is used/connected. Conducting pins 290 may enable/allow a processor of a videogame controller to access and/or operate on information stored in memory 270. In some embodiments (e.g., embodiments where the smart UID 200 or subpart thereof does not include its own microprocessor or microcontroller), signals generated by sensor 260 may be interpreted by the videogame controller's processor, and the videogame controller's processor may thereafter cause data to be written into memory 270 that corresponds to usage of the smart UID 200 (e.g., based on the information received from the sensor, and/or in accordance with instructions stored on memory 270). In some embodiments, only certain information may be accessible to a videogame controllers componentry (e.g., its processor), and/or only certain read/write operations may be performed by a videogame controller's componentry. That is, in some embodiments the memory 270 may not be entirely accessible to a non-local processor, and in other embodiments it may.

In some embodiments, smart UIDs of the present disclosure may be communicatively coupled with a computing device and/or a display. The computing device may read information from the smart UID's memory, and, upon execution of machine readable instructions effectuating the same, provide a visual indication of the smart UIDs usage and/or remaining life. In some instances, visual indications for multiple smart UIDs inserted within a videogame controller may be provided on the interface.

Figure 6:
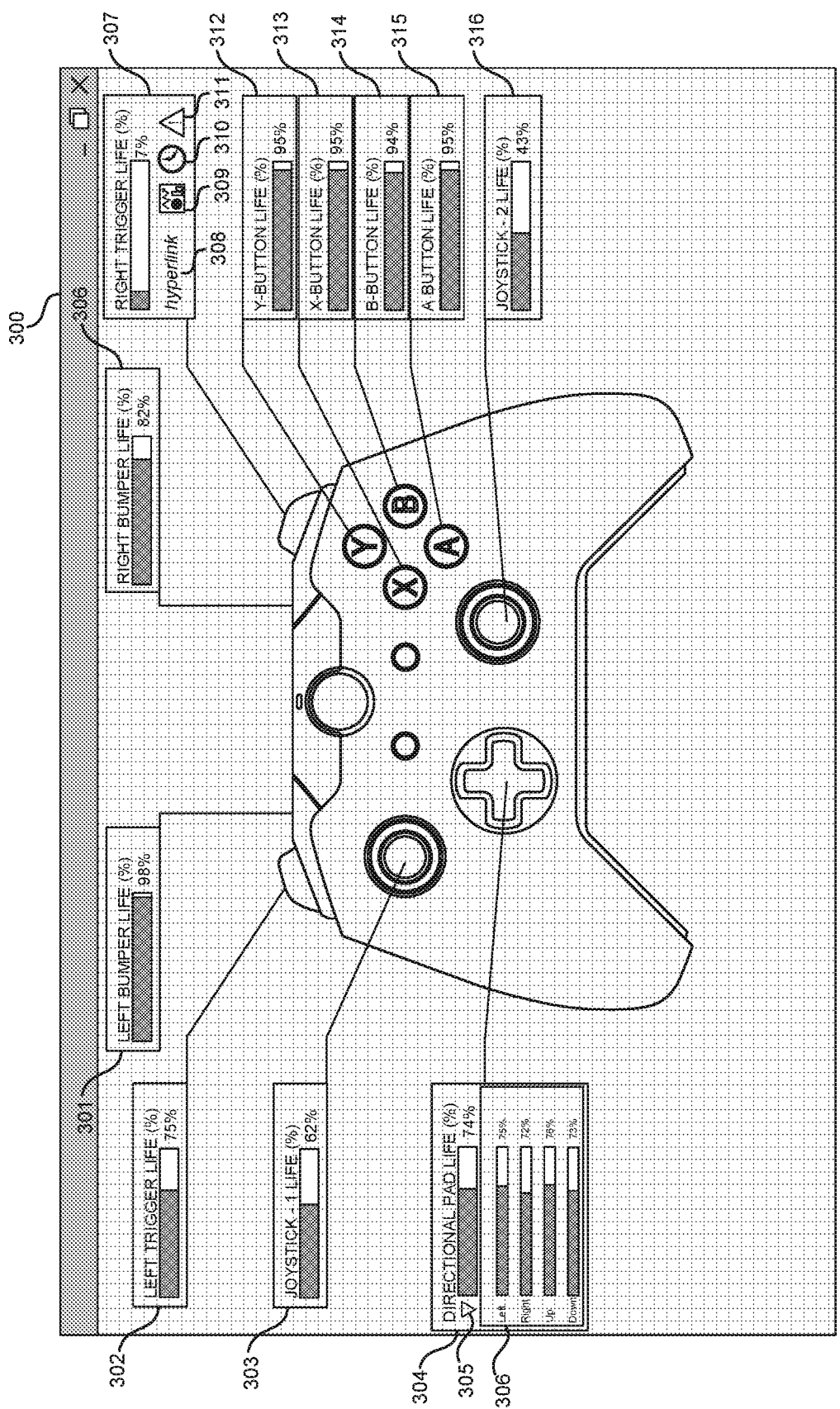
FIG. 6 illustrates an example GUI that may be configured to provide about one or more smart UIDs of a connected videogame controller, in accordance with one or more embodiments of the present disclosure.

FIG. 6 illustrates an example GUI that may be configured, by executing machine readable instructions stored in a memory operatively coupled to a processor, to provide information (e.g., via visual, graphical, numerical, textual, or animated representation) about one or more smart UIDs of a connected videogame controller. The information may be obtained computed, estimated or determined (via execution of machine readable instructions) based upon information obtained from the memories of the connected smart UIDs, or their subparts, in accordance with one or more embodiments of the present disclosure. The information, or estimates/computations/determinations based on the information, may be provided to a computing device or display whereupon the GUI may be provided. In some embodiments, as shown, the GUI may include detail windows (or zones) associated with the various smart UIDs of the videogame controller. The detail windows may include a range of information about a given smart UID, based on the information obtained from the memories of the one or more connected smart UIDs. This information may include any information about the smart UID, including, by way of example and not by way of limitation: an estimated percentage of life remaining for the given smart UID; an estimated percentage of life used up for a given smart UID; an estimated real-world time-to-failure of a given smart UID based on the usage history for the smart UID; an estimated calendar date upon which the smart UID is expected to fail; an estimated date upon which a new UID should be ordered; a breakdown of the usage data for individual subparts of the smart UID (e.g., the SMC, the SIC, etc.); and the like.

Further still, in some embodiments, the presently disclosed systems, devices, and methods may provide: an alert or notification to a user; a graphical representation of the history of the smart UID's usage (e.g., a detailed dive into patterns of use, forces applied, fatigue cycles, times of peak usage, pressure patterns, etc.); a link or hyperlink to a website where the correct replacement part may be ordered; a link or hyperlink to a website with a tutorial or other information about how to remove, install and/or clean the smart UID part of interest; etc.

For example, FIG. 6 illustrates a GUI showing smart UID lifetime information for the smart UIDs associated with a connected videogame controller, in accordance with one or more embodiments of the present disclosure. As shown, one or more details about each smart UID may be provided in detail windows associated with the various smart UIDs (here, graphically/visually associated by lines). For example, as shown in GUI 300, detail window 301 is associated with and provides information about the life remaining in the left bumper styled smart UID (e.g., the amount of time until the left bumper styled smart UID is expected to fail or malfunction). As shown, the information is represented as a percentage of total expected life (e.g., 98%), but it may be represented in any manner, and for any other metric relevant to a smart UIDs condition, including any of the measures/metrics/determinations/estimates/computations discussed herein. As shown, the information may be conveyed in one or more of a graphical (e.g., symbolic status/progress bar) or numerical/textual manner (e.g., "75%").

In some embodiments, as discussed above, a given smart UID may have several subparts or subcomponents for which lifetime information is also tracked and stored, and, in some instances, of which the smart UID's total estimated lifetime is a function. For instance, detail window 304 includes information about the directional pad styled smart UID. A dropdown feature 305 (which may be selected by a user) may provide additional information in zone 306 about the subparts or subcomponents of the directional pad styled smart UID; here, providing additional information about the left, right, up and down tact buttons the directional pad structural component interacts with to actuate functionality within the game. The total lifetime measure (or other metric being measured/provided) of the smart UID may be computed based on an aggregate measure of the one or more subpart total lifetime measures (which may or may not be of the same type of measure or metric). For example, as shown in FIG. 6 with reference to numerals 304 and 305, the directional pad smart UID is shown as having 74% of its total expected life remaining. This may be computed based on an average of the expected life remaining for each of the one or more reporting subcomponents (e.g., left tact button (75%)+right tact button (72%)+up tact button (76%)+down tact button (73%)/(4)=(74%)). In other embodiments, a minimum (or any other statistical measure) might be computed and form the basis for the information conveyed about the smart UID (e.g., the directional pad smart UID showing 72% (minimum) in the context of the foregoing example, instead of showing 74% (average)).

In some embodiments, the GUI may provide a selectable link or hyperlink to a site where the correct replacement part may be ordered for a particular smart UID, or a link or hyperlink to a site where a tutorial or other information about how to order, remove, repair, install and/or clean the smart UID part of interest; etc. Such a link or hyperlink may be included within a detail window for a UID. For example, detail window 307 associated with the right trigger smart UID includes a hyperlink 308 which a user may select to visit a website where a replacement right trigger smart UID may be purchased. Hyperlinks may be provided for each smart UID at all times, or at selective times. For instance, hyperlink 308 may only appear in detail window 307 when the expected life remaining for the right trigger falls beneath a certain threshold (e.g., when the expected life remaining for the smart UID falls below 25%). In other examples, any other computation, determination, or triggering event may cause machine readable code to be executed such that a relevant hyperlink appears in the GUI displaying information about a smart UID.

In some embodiments, the GUI may provide a selectable icon which may open an expanded view or other graphical representation of the history of the smart UID's usage. For example, the selectable icon 309 associated with the right trigger styled smart UID may be selected to open a window that provides a more a detailed dive into the patterns of use (over a specified period of time), the force(s) applied to various parts of the smart UID, fatigue cycles, times of peak use, pressure patterns, calendar time and/or date of expected failure, etc.

In embodiments, any number of other selectable icons may be provided via the GUI to provide information or communication with a user about the information. For instance, clock icon 309 may be selected to provide more detailed information about the dates and times of expected failures, the suggested last date to place an order for a new UID component to avoid interruption, etc. In another example, notification/alert icon 311 may be provided when the system generates a notification or alert (e.g., relevant message) for the user. For instance, the system of the present disclosure may determine, via execution of machine readable instructions, that the left trigger is used substantially less than the right trigger, and may notify the user (when the right trigger falls below a predetermined threshold, for example) that they may swap the left and right triggers (instead of buying an entirely new right trigger smart UID) in order to efficiently extend the usable life of the smart UIDs as implemented with the given controller. Such alerts or notifications, or any of the other information obtained or determined by the systems and methods disclosed herein, may be forwarded or provided to a user via other displays as well, such as the display of their cellular phone via SMS message.

Figure 7:
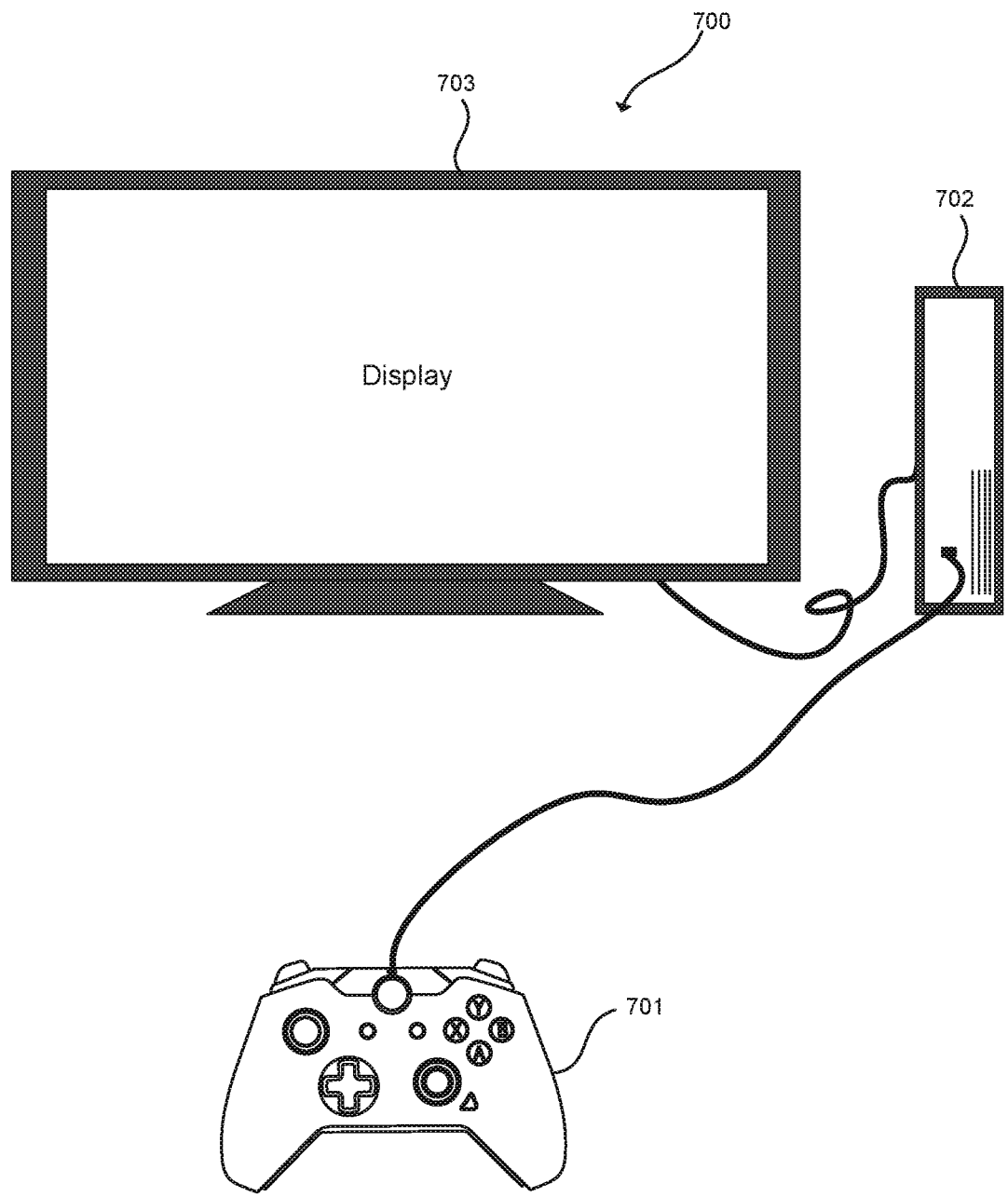
FIG. 7 illustrates an example system within which the smart UID technology of the present disclosure may be implemented, in accordance with one or more embodiments of the present disclosure.

FIG. 7 illustrates an example system within which the smart UID technology of the present disclosure may be implemented, in accordance with one or more embodiments of the present disclosure. As shown, system 700 may include a display 703, a videogame console 702, and a videogame controller 701 including one or more smart UIDs as disclosed herein. Any one or more of videogame controller 701 (including one or more of the smart UIDs deployed within the videogame controller 701), the videogame console 702, and the display 703 may be communicatively, electrically, and/or mechanically coupled with one another to facilitate the systems and methods disclosed herein. For example, the circuitry and electronic components included in videogame controller 701 may access the local memories of one or more of the individual smart UIDs, and/or may process the information in accordance with machine readable instructions, and/or may generate signals that may be transmitted to console 702. The videogame being run via console 702, or the console 702 (e.g., through an operating system run by the console), may include the machine readable instructions that, when executed, provide a GUI on display 703 such as GUI 300 illustrated in FIG. 6. The GUI may be in the form of a subframe of a larger GUI, or in some embodiments may be a selectable menu item a user may select through the game interface.

Figure 10:
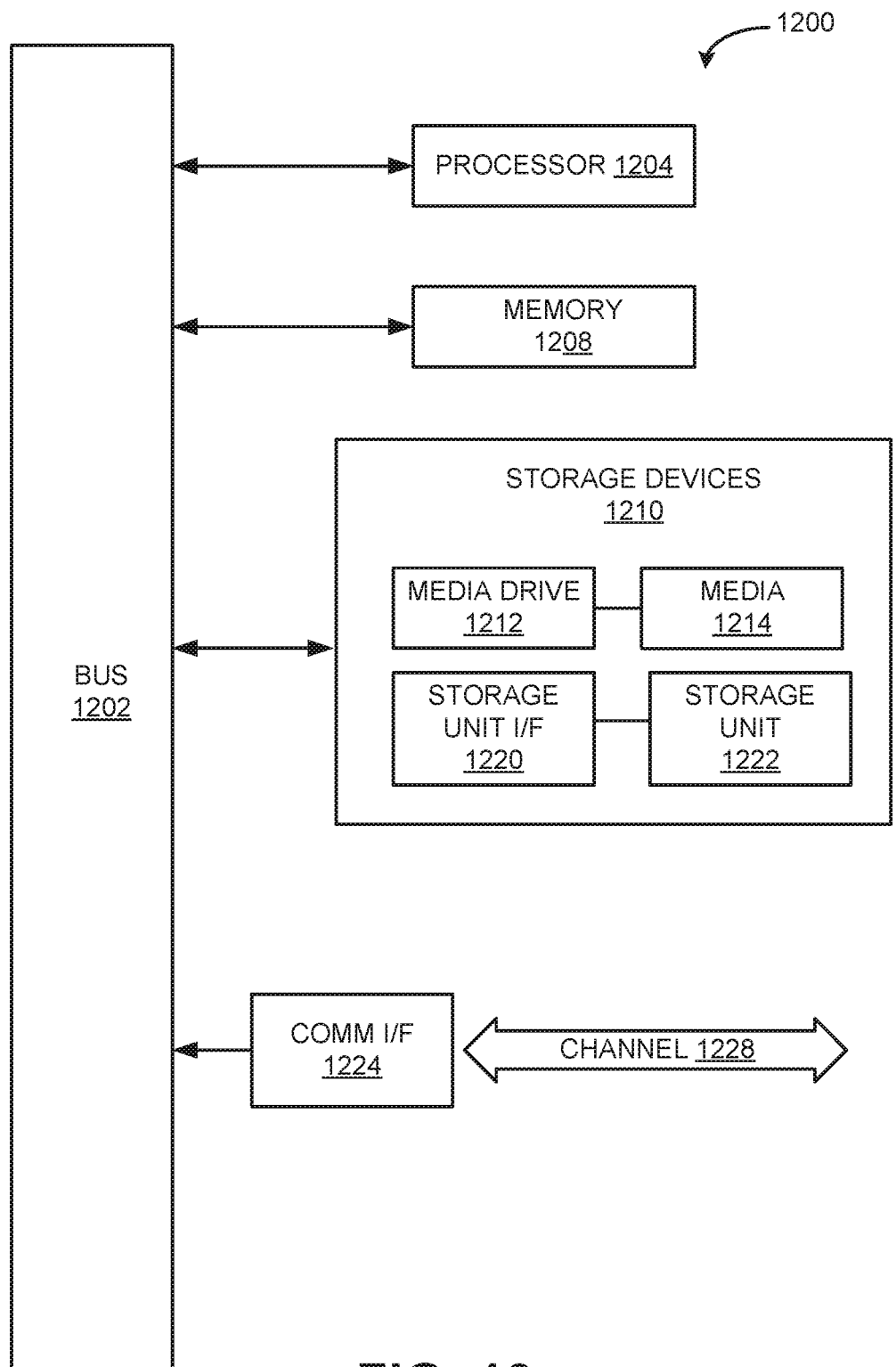
FIG. 10 illustrates an example computing module that may be used, either in the smart UID, the video game controller, or the console of the present disclosure to implement various features of the systems and methods as disclosed herein.

The components of system 700 are depicted as being communicatively coupled through one or more wires (e.g., wire 704, 705). However, it should be noted that wireless communication protocols may also be employed as desired in the various embodiments of the present disclosure. Moreover, although not depicted in this manner, in some embodiments of the present disclosure the display 703, the console 702, the controller 703, and the smart UIDs may all be comprised in a single device (e.g., a handheld Nintendo 3DS). Further, any one or more of the foregoing may include or be otherwise deployed with computing modules and/or technology that enables any one or more of the features and/or technologies disclosed herein. FIG. 10 discusses such modules in further detail.

In some embodiments, the user may be prompted (by the game, by the controller, or otherwise), to perform a pattern of button presses so that the system may determine the performance or weakness of any one or more of the collective parts. For example, the system may suggest (e.g., via an alert, notification, or otherwise) that the user execute a pattern of button, trigger, and or joystick operations that are required for a given game. The user may perform these operations, the signals generated in response thereto may be perceived and compared against a model or template signal profile for the same pattern, and, based on the comparison, the system may determine which of the one or more smart UIDs is not working properly such that the functionality desired in the game cannot be activated, or is not expected to function as consistently as desired. This type of information may be relevant to an estimated lifetime of the overall controller (which may have its own local memory storing the same type of information discussed herein with respect to individual smart UIDs), and/or may be relevant to a computation performed for the determination/estimated remaining lifetime of an individual smart UID.

Figure 8:
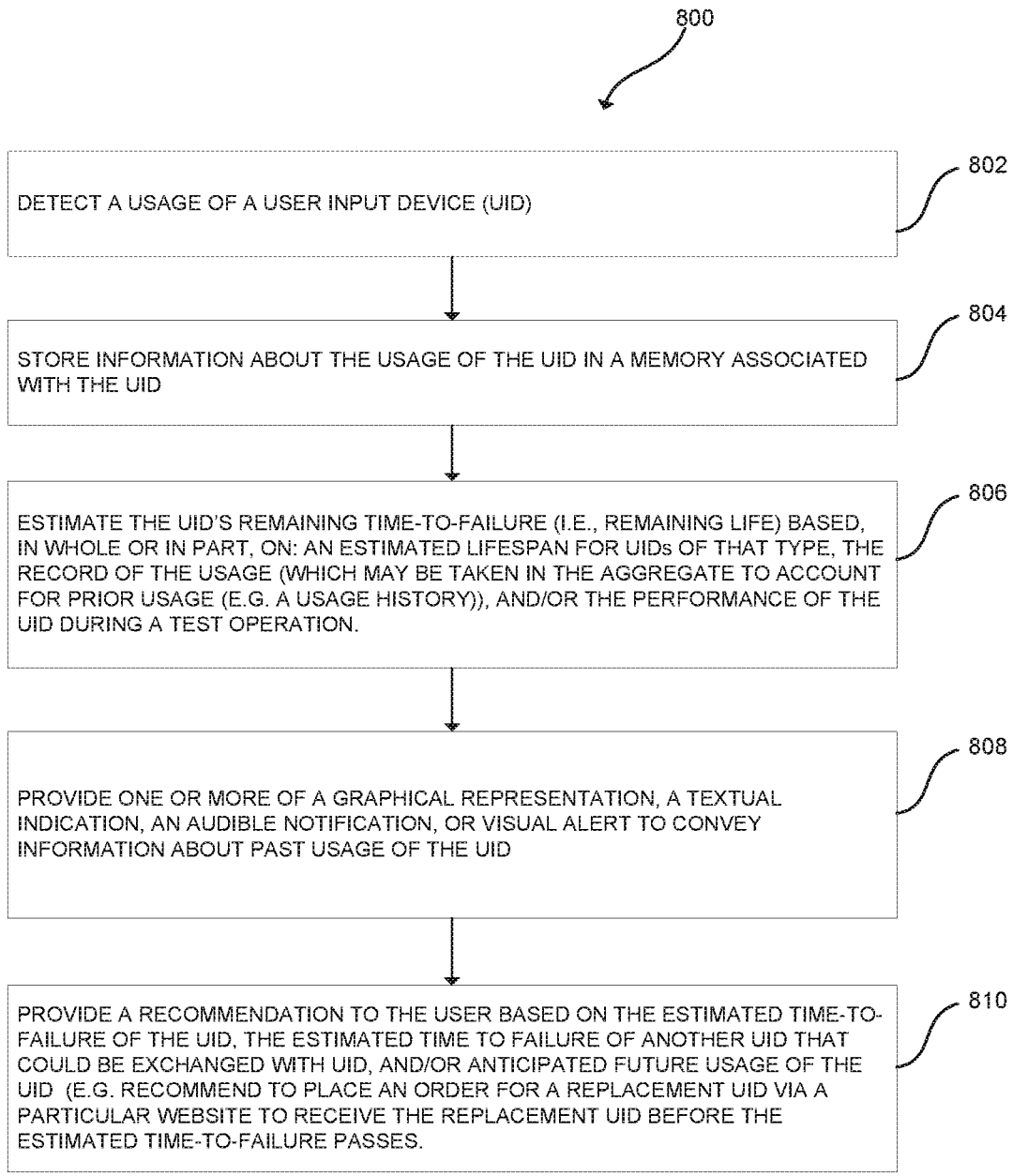
FIG. 8 illustrates an example method for providing information to a user relevant to a smart UID, in accordance with one or more embodiments of the present disclosure.

FIG. 8 illustrates an example method 800 for providing information to a user relevant to a smart UID, in accordance with one or more embodiments of the present disclosure. As shown, at operation 802, method 800 may detect a usage of a smart UID. At operation 804, method 800 may store information about the usage of the smart UID in a local memory associated with the smart UID. At operation 806, method 800 may estimate the smart UID's remaining time-to-failure (i.e., remaining life) based, in whole or in part, on: an estimated lifespan for smart UIDs of that type, the usage measure (which may be accumulated to account for prior usage (e.g., a usage history), and/or the performance of the smart UID during a test operation. At operation 808, method 800 may provide one or more of a graphical representation, a textual indication, an audible or visual notification or alert conveying information about past usage or current condition of the smart UID. At operation 810, method 800 may provide a recommendation to the user based on the estimated time-to-failure of the smart UID, the estimated time to failure of another smart UID that could be exchanged with the smart UID, and/or anticipated future usage of the smart UID (e.g., recommend to place an order for a replacement smart UID via a particular website to receive the replacement UID before the estimated time-to-failure passes).

Figure 9:
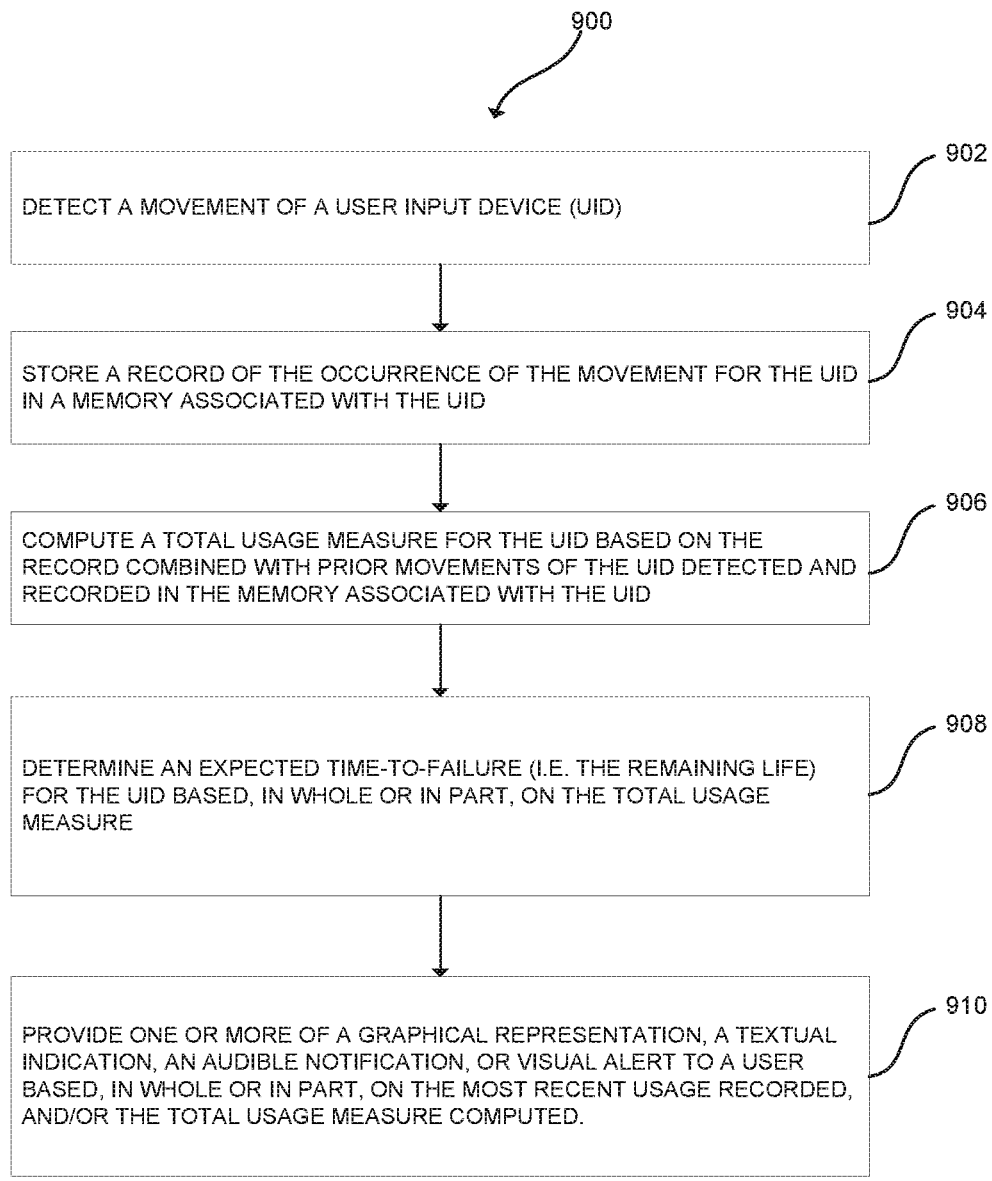
FIG. 9 illustrates an example method for providing information to a user relevant to a smart UID, in accordance with one or more embodiments of the present disclosure.

FIG. 9 illustrates an example method 900 for providing information to a user relevant to a smart UID, in accordance with one or more embodiments of the present disclosure. As shown, at operation 902, method 900 may detect a movement of a smart UID. At operation 904, method 900 may store a record of the occurrence of the movement for the smart UID in a memory associated with the smart UID. At operation 906, method 900 may compute a total usage measure for the smart UID based on the record combined with prior movements of the smart UID detected and recorded in the memory associated with the smart UID. At operation 908, method 900 may determine an expected time-to-failure (i.e., the remaining life) for the smart UID based, in whole or in part, on the total usage measure. At operation 910, method 900 may provide one or more of a graphical representation, a textual indication, an audible notification, or visual alert to a user based, in whole or in part, on the most recent usage recorded, and/or the total usage measure computed.

Although many of the embodiments of the present disclosure have been shown to include a local memory 160, 260 located onboard the smart UID hardware, in some embodiments of the present technology the usage information/data is instead stored in a memory location of the videogame controller itself, with no memory unit being deployed on the smart UID. In such embodiments, in addition to the various types of information about smart UID usage that can be stored (as disclosed herein with reference to local memory 160, 260), an additional unit of data may be stored in the videogame controller's memory that links specific smart UID usage information/data to a specific smart UIDs. For instance, a serial number or ID that corresponds to ID 180, 280 may be associated with a subset of the usage data stored in the memory such that the usage information for one smart UID may be distinguished from that of another smart UID. Furthermore, the usage information for a given smart UID may be uploaded and stored on an external resource (e.g., cloud storage, servers) that may be accessible to any number of registered users. Thus, in embodiments that do not deploy a local memory 160, 260 locally on the smart UID hardware itself, information about the smart UID may nevertheless be determined by referring to the last uploaded data associated with the given smart UID on an external database (e.g., a national database).

Moreover, in some embodiments of the presently disclosed technology, the detection, tracking, and storage of information related to smart UID usage may require resources from the processing engine of the videogame controller that cause a time delay (i.e., a lag) in other features of the videogame controller—especially where the processing engine of the videogame controller has limited capacity to perform multiple and/or additional operations simultaneously. For example, detection and tracking of smart UID usage may require a videogame controller's processing engine (e.g., a microcontroller unit, MCU) to execute additional operations to determine/validate when a usage event has actually occurred (e.g., when a button has actually been pressed). That is, in some embodiments of the disclosed technology, before building the data packet that gets sent to the console to indicate a button has been pressed, the videogame controller's processing engine (e.g., an MCU) may be required to implement one or more additional filtering operations to separate out mechanical vibrations that are sensed but which are not actual presses of the button (so that all the mechanical vibrations that get sensed by a sensor don't get counted as multiple presses for purposes of registering the usage data in a memory).

Performing such additional operations, including filtering operations, requires additional resources from the processing engine (e.g., the MCU), and, depending on the processing speed/capability of the MCU, may cause an interruption, delay, and/or failure with respect to other functions or operations the MCU manages, monitors, and/or controls (e.g., Audio CODEC, memory, Bluetooth IC, packetizing the data sent to the console (i.e., building the data packet), etc.). Such interruptions, delays, and/or failures may cause an overall lag or dysfunction in the performance or operation of the videogame controller (e.g., delay the turnaround time between the moment the smart UID is actuated and the moment the data packet is sent to the controller, which in some instances may entirely miss the delivery window within which the data packet must be sent). Such a lag or dysfunction is undesirable in the context of a gaming environment, or in other environments. Thus, in accordance with one or more embodiments of the present disclosure, a videogame controller system is provided comprising two or more processing engines (e.g., two or more MCUs), each configured to be dedicated to handling certain functionality.

For example, in some embodiments a first MCU may be dedicated to processing signals for the smart UIDs, building the data packets corresponding to those signals and reporting them to the console (e.g., in real time or near real time). A second MCU may be dedicated to generating lighting effects, managing the Audio CODEC, performing statistical analysis, managing the Bluetooth IC or other IC, sensing other events, storing information in a memory (e.g., a serial flash), and any other functionality or operation of the videogame controller. Thus, by deploying at least two processing engines in the videogame controller, at least one of which dedicated, in whole or in part, to smart UID signal processing and packetization, the other MCU(s) may be utilized for the remaining functions or operations.

In some instances the first processing engine may even me more narrowly dedicated to handling signal processing and packetization of a subset of the most heavily used UIDs, offloading the remaining processing workload to the second processing engine. For example, in some embodiments a first MCU may be dedicated to processing signals for a primary set of buttons (smart UIDs in the location of UID 12, 18, 24, and 20 of FIG. 1), processing the signals and building the data packets to report back to the console on a real time or near real time basis. A second MCU may then be dedicated to processing a set of secondary buttons (smart UIDs in the location of UID 14, 22, 16, and 20 of FIG. 1), generating lighting effects, managing the Audio CODEC, performing statistical analysis, managing the Bluetooth IC or other IC, sensing other events, storing information in a memory (e.g., a serial flash).

To further reduce the turnaround time between a UID being actuated and the data packet being sent (via signal) to the console, dedicated hardware may be provided between the smart UID and the MCU of the controller to filter the signal generated by the UID before it is sent to the MCU for packetization. Such dedicated hardware may include any such filtering hardware known in the art.

FIG. 10 illustrates an example computing module that may be used, either in the smart UID, the video game controller, or the console of the present disclosure to implement various features of the systems and methods as disclosed herein.

Referring now to FIG. 10, computing module 1200 may represent, for example, computing or processing capabilities found within desktop, laptop, notebook, gaming consoles, and tablet computers; hand-held computing devices (tablets, PDA's, smart phones, cell phones, palmtops, etc.); wearable computing devices such as smartwatches; mainframes, supercomputers, workstations or servers; or any other type of special-purpose or general-purpose computing devices as may be desirable or appropriate for a given application or environment. Computing module 1200 might also represent computing capabilities embedded within or otherwise available to a given device. For instance, a computing module might be found in other electronic devices such as, for example, digital cameras, videogame consoles, gaming controllers, navigation systems, cellular telephones, videogame controllers, portable computing devices, modems, routers, WAPs, terminals and other electronic devices that might include some form of processing capability.

Computing module 1200 might include, for example, one or more processors (e.g., such as processor 175, processor 275, etc.), controllers, control modules, or other processing devices, such as a processor 1204. Processor 1204 might be implemented using a general-purpose or special-purpose processing engine such as, for example, a microprocessor, controller, or other control logic. In the illustrated example, processor 1204 is connected to a bus 1202, although any communication medium can be used to facilitate interaction with other components of computing module 1200 or to communicate externally.

Computing module 1200 might also include one or more memory modules, simply referred to herein as main memory 1208. For example, preferably random access memory (RAM) or other dynamic memory, might be used for storing information and instructions to be executed by processor 1204. Main memory 1208 might also be used for storing temporary variables or other intermediate information during execution of instructions to be executed by processor 1204. Computing module 1200 might likewise include a read only memory ("ROM") or other static storage device coupled to bus 1202 for storing static information and instructions for processor 1204.

The computing module 1200 might also include one or more various forms of information storage mechanism 1210, which might include, for example, a media drive 1212 and a storage unit interface 1220. The media drive 1212 might include a drive or other mechanism to support fixed or removable storage media 1214. For example, a hard disk drive, a solid state drive, a magnetic tape drive, an optical disk drive, a CD, DVD, or Blu-ray drive (R or RW), or other removable or fixed media drive might be provided. Accordingly, storage media 1214 might include, for example, a hard disk, a solid state drive, magnetic tape, cartridge, optical disk, a CD, DVD, Blu-ray or other fixed or removable medium that is read by, written to or accessed by media drive 1212. As these examples illustrate, the storage media 1214 can include a computer usable storage medium having stored therein computer software or data.

In alternative embodiments, information storage mechanism 1210 might include other similar instrumentalities for allowing computer programs or other instructions or data to be loaded into computing module 1200. Such instrumentalities might include, for example, a fixed or removable storage unit 1222 and an interface 1220. Examples of such storage units 1222 and interfaces 1220 can include a program cartridge and cartridge interface, a removable memory (for example, a flash memory or other removable memory module) and memory slot, a PCMCIA slot and card, and other fixed or removable storage units 1222 and interfaces 1220 that allow software and data to be transferred from the storage unit 1222 to computing module 1200.

Computing module 1200 might also include a communications interface 1224. Communications interface 1224 might be used to allow software and data to be transferred between computing module 1200 and external devices. Examples of communications interface 1224 might include a modem or softmodem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 1224 might typically be carried on signals, which can be electronic, electromagnetic (which includes optical) or other signals capable of being exchanged by a given communications interface 1224. These signals might be provided to communications interface 1224 via a channel 1228. This channel 1228 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to transitory or non-transitory media such as, for example, memory 1208, storage unit 1220, media 1214, and channel 1228. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing module 1200 to perform features or functions of the present application as discussed herein.

Although described above in terms of various example embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the application, whether or not such embodiments are described and whether or not such features are presented as being a part of a described embodiment. Thus, the breadth and scope of the present application should not be limited by any of the above-described example embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of example block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

While various embodiments of the present disclosure have been described above, it should be understood that they have been presented by way of example only, and not of limitation. Likewise, the various diagrams may depict an example architectural or other configuration for the disclosure, which is done to aid in understanding the features and functionality that can be included in the disclosure. The disclosure is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the present disclosure. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

We claim:

1. A control of a handheld video game controller, comprising:
   a structural interface component to couple to an actuation component; and
   a sensor module comprising:
      the actuation component;
      a sensor to detect actuation of the actuation component in response to movement of the structural interface component;
      a memory configured to store information associated with the detected actuation, wherein the information associated with the detected actuation comprises a value corresponding to an amount the control has been used over a period of time, wherein the value is updated over time in response to the sensor detecting actuation; wherein the memory stores information indicating an amount each of a plurality of subcomponents of the control has been used over a period of time; and
      a casing to house the sensor and memory.

2. The control of claim 1, wherein the control is to electrically and physically couple to the handheld video game controller, wherein a processor of the handheld video game controller is to receive a signal generated by the sensor in response to detecting actuation, and wherein the processor of the handheld video game controller is to cause data to be stored in the memory in response to receiving the signal.

3. The control of claim 2, further comprising: one or more conducting pins to electrically couple the control to the handheld video game controller such that the handheld video game controller is to cause data corresponding to usage of the control to be written into the memory.

4. The control of claim 2, wherein the control is removably coupled to the handheld video game controller.

5. The control of claim 1, further comprising: a light emitting diode configured to provide a visual indication about an expected remaining life of the control using at least the information stored in the memory.

6. The control of claim 1, wherein the memory further stores a read-only identifier of the control.

7. The control of claim 1, wherein the structural interface component is a directional pad, wherein the actuation component comprises tact buttons, wherein the directional pad is coupled to the tact buttons such that when the directional pad is pressed in an area over one of the tact buttons, the sensor detects actuation of the tact buttons.

8. The control of claim 7, wherein the memory stores information indicating an amount each of the plurality of tact buttons has been actuated over a period of time.

9. The control of claim 1, wherein the memory stores a value corresponding to a total number of detected actuations of the control over a period of time or a value corresponding to a total number of remaining actuations of the control before expected failure.

10. The control of claim 1, wherein the memory stores a value representing a life expectancy of the user input device or a subcomponent of the user input device based on a total number of actuations of the control.

11. A handheld video game controller, comprising:
    a plurality of controls removably coupled to the handheld video game controller, each of the plurality of the controls comprising:
       a structural interface component, wherein the structural interface component is a thumbstick, a directional pad, a button, a trigger, or a bumper;
       an actuation component;
       a sensor to detect actuation of the actuation component in response to movement of the structural interface component; and
       a memory configured to store information associated with the detected actuation, wherein the information associated with the detected actuation comprises a value corresponding to an amount the control has been used over a period of time, wherein the value is updated over time in response to the sensor detecting actuation; and
       a casing to house the sensor and memory; and
    circuitry configured to access the memory of each of the plurality of controls and obtain the information stored in each of the memories.

12. The handheld video game controller of claim 11, further comprising: a processor, wherein each of the plurality of controls is configured to electrically and physically couple to the video game controller, wherein the processor is configured to receive a signal generated by the sensor of each of the plurality of controls in response to detecting actuation, and wherein the processor is configured to cause data to be stored in the memory of the control in response to receiving the signal.

13. The handheld video game controller of claim 11, wherein the value corresponds to a total number of detected actuations of the control over a period of time or a total number of remaining actuations of the control before expected failure.

14. The handheld video game controller of claim 11, wherein the plurality of controls removably coupled to the handheld video game controller comprise a first control and a second control, the structural interface component of the first control being different from the structural interface component of the second control, wherein the memory of each of the plurality of controls stores a read-only identifier of the control that differs from the stored read-only identifiers of the other controls.

15. A non-transitory computer-readable medium having executable instructions stored thereon that, when executed by a processor, cause the processor to perform operations of:
    retrieving, from a memory of each of a plurality of controls of a handheld video game controller, a stored record of the occurrence of movement of the control, wherein each of the plurality of controls is removably coupled to the handheld video game controller, wherein each of the plurality of controls comprises a structural interface component that is a thumbstick, a directional pad, a button, a trigger, or a bumper;

computing a total usage measure for each of the plurality of controls using at least the stored record retrieved from the memory of the control;

determining an expected life of each of the plurality of controls using at least the total usage measure computed for the control; and presenting, via a gaming console communicatively coupled to the handheld video game controller, a graphical user interface to a user, the graphical user interface displaying a visual representation of the determined expected life of each of the plurality of controls.

16. A control of a handheld video game controller, comprising:

a structural interface component to couple to an actuation component, wherein the structural interface component is a thumbstick, a directional pad, a button, a trigger, or a bumper; and a sensor module comprising:

the actuation component;

a sensor to detect actuation of the actuation component in response to movement of the structural interface component;

a memory configured to store information associated with the detected actuation, wherein the information associated with the detected actuation comprises a value corresponding to an amount the control has been used over a period of time, wherein the value is updated over time in response to the sensor detecting actuation; and a casing to house the sensor and memory, wherein the memory stores machine readable instructions that, when executed by a processor coupled thereto, computes one or more of the following parameters: a total number of times the control was pressed since a repair event, an average number of times the control was pressed during a particular game or gaming session, and a proportional use of the control relative to other controls of the handheld video game controller.

* * * * *